US009773154B2

(12) United States Patent
Jiménez Cisneros et al.

(10) Patent No.: US 9,773,154 B2
(45) Date of Patent: Sep. 26, 2017

(54) SYSTEM FOR THE IDENTIFICATION AND QUANTIFICATION OF HELMINTH EGGS IN ENVIRONMENTAL SAMPLES

(71) Applicant: UNIVERSIDAD NACIONAL AUTÓNOMA DE MÉXICO, Coyoacán, Distrito Federal (MX)

(72) Inventors: Blanca Elena Jiménez Cisneros, Distrito Federal (MX); Catalina Maya Rendón, Distrito Federal (MX); Gustavo Adolfo Rodrigo Velásquez Rodríguez, Distrito Federal (MX); José Antonio Barrios Pérez, Distrito Federal (MX); Fernando Arámbula Cosio, Distrito Federal (MX)

(73) Assignee: UNIVERSIDAD NACIONAL AUTÓNOMA DE MÉXICO, Coyoacá, Distrito Federal (MX)

( * ) Notice: Subject to any disclaimer, the term of this patent is extended or adjusted under 35 U.S.C. 154(b) by 48 days.

(21) Appl. No.: 14/879,466

(22) Filed: Oct. 9, 2015

(65) Prior Publication Data
US 2017/0103504 A1    Apr. 13, 2017

(51) Int. Cl.
*G06T 5/20* (2006.01)
*G06T 5/40* (2006.01)
(Continued)

(52) U.S. Cl.
CPC ....... *G06K 9/0014* (2013.01); *G06K 9/00147* (2013.01); *G06T 7/0012* (2013.01);
(Continued)

(58) Field of Classification Search
CPC .. G06T 5/20; G06T 5/40; G06T 7/408; G06T 7/602; G06T 2207/20024; G06K 9/4647
See application file for complete search history.

(56) References Cited

U.S. PATENT DOCUMENTS 8,068,132 B2 * 11/2011 Bruno ................ G01N 15/1475
                                                              348/42
9,224,200 B2 * 12/2015 Bruun ..................... G06T 7/0012
(Continued)

OTHER PUBLICATIONS

Ghazali et al., Microscopy Image Processing Analysis for Automatic Detection of Human Intestinal Parasites ALO and TTO, IEEE 2013.*

(Continued)

*Primary Examiner* — Sean Conner
*Assistant Examiner* — Pinalben Patel
(74) *Attorney, Agent, or Firm* — Heslin Rothenberg Farley & Mesiti P.C.

(57) ABSTRACT

Process and system for identifying and quantifying helminth eggs in water, sludge, biosolid and/or excreta samples among others, from images comprising filtering the images with an anisotropic filter maintaining the borders of the images, obtaining filtered images; filtering the filtered images applying Laplacian of Gaussian detecting changes in the filtered images, and obtaining binarized images; separating the binarized images by means of a filtered distance field Watershed filter, obtaining the images; filtering the images eliminating objects by perimeter compactness, considering the size of the objects in the images filtered again and separating the differences to avoid false positives, obtaining images with identified objects; characterizing the objects identified in the images segmenting the objects by means of gray profiles; and classifying the characterized objects according to a statistic classifier for identifying and quantifying different species of helminth eggs.

15 Claims, 17 Drawing Sheets

(51) Int. Cl.
- *G06K 9/46* (2006.01)
- *G06T 7/60* (2017.01)
- *G06T 7/40* (2017.01)
- *G06K 9/00* (2006.01)
- *G06T 7/62* (2017.01)
- *G06T 7/00* (2017.01)

(52) U.S. Cl.
CPC ........ *G06T 7/62* (2017.01); *G06K 2009/4666* (2013.01); *G06T 2207/10056* (2013.01); *G06T 2207/30024* (2013.01)

(56) References Cited

U.S. PATENT DOCUMENTS

| | | | | |
|---|---|---|---|---|
| 2008/0002908 | A1* | 1/2008 | Chinen | G06T 5/002 382/274 |
| 2008/0007747 | A1* | 1/2008 | Chinen | G06T 5/002 358/1.9 |
| 2009/0148014 | A1* | 6/2009 | Kanda | A61B 1/041 382/128 |
| 2010/0104148 | A1* | 4/2010 | Bovik | G06K 9/4633 382/128 |
| 2010/0272340 | A1* | 10/2010 | Bar-Aviv | G06T 5/20 382/131 |
| 2013/0115606 | A1* | 5/2013 | Hansen | C12M 23/16 435/6.12 |

OTHER PUBLICATIONS

NPL, Shanmugam et al, High Throughput Detection of Helminth Eggs Using Mobile Phone Microscopy, IEEE 2015.*

Avci, D.,Varol, A. (2009) An expert diagnosis system for classification of human parasite eggs based on multi-class SVM, Expert Systems with Applications. 36: 43-48. doi:10.1016/j.eswa.2007.09.12.

Dogantekin, E. et al. (2008) A robust technique based on invariant moments—ANFIS for recognition of human parasite eggs in microscopic images, Expert Systems with Applications. 35: 728-738. doi:10.1016/j.eswa.2007.07.20.

Sauvola J., Pietikainen, M. (2000) Adaptive document image binarization, Pattern Recognition 33: 225-236. PII: S 0031-3203(99)00055-2.

WHO (1989) Health guidelines for the use of wastewater in agriculture and aquaculture. Technical Report Series No. 778, World Health Organization, Geneva, Switzerland.

WHO (2006) Guidelines for the safe use of wastewater, excreta and greywater. V.II. Wastewater use in agriculture vol. II. World Health Organization (Ed). Geneva, Switzerland. ISBN 924154683 2.

Yang, Y.S., Park, D.K., Kim, H.C., Choi, M-H and Chai, J-Y. (2001) Automatic identification of human helminth eggs on microscopic fecal specimens using digital image processing and an artificial neural network, IEEE Transactions on Biomedical Engineering. 48(6):718-730. PII: S 0018-9294(01)04170-2.

\* cited by examiner

SYSTEM FOR THE IDENTIFICATION AND QUANTIFICATION OF HELMINTH EGGS IN ENVIRONMENTAL SAMPLES

FIELD OF THE INVENTION

Present invention refers to a process and system for identifying and quantifying helminth eggs in environmental samples, and more particularly to the automatic identification and quantification of helminth eggs present in wastewater, sludge, biosolids, soil, and/or excreta, among other samples, from microscopy images generated in the laboratory.

BACKGROUND

The reusing of wastewater in agriculture is an extensive practice, whose benefits are multiple given that a large amount of first use water volumes are saved, agricultural production costs are slashed by decreasing the use of artificial fertilizers, lowering contamination to superficial bodies of water (such as rivers, dams and lakes) by avoiding spilling into them large amounts of volumes of treated wastewater without attempting to notably increase crop yield. However, the use of wastewater also represents a health risk, mainly given the content of different pathogenic organisms. Many of these are capable of surviving sufficient amount of time in wastewater, crops and/or soil enabling their transmission to humans either directly or indirectly. Among these organisms are found helminth eggs, parasites commonly known as intestinal worms, whose real risk of infection to product consumers, as well as to agricultural workers and their families, is highly dangerous, given their wide persistence in the environment and their low dosage of infectiousness.

It is important to point out that, traditionally, the biological quality of water has been measured through a bacterial group called fecal coliforms, a group which does not ensure the inactivation or elimination of other types of parasites, which also have their origin in the excretions of infected individuals; so that they are not reliable indicators of the presence of helminth eggs in the contaminated water, excreta or sludge; nor of their behavior during the treatment processes of these. Given this, since 1989 the World Health Organization (WHO) proposed a limit to control the amount of wastewater which is used for spraying, and in 2006 endorsed the importance of controlling helminth eggs in the environment. However, in various world forums, the difficulty of applying these criteria from the World Health Organization has been recognized, given the existence of areas with high helminth egg content, where it is practically impossible to use rentable treatment methods and to the variety of analytical techniques applied to quantify them. To this latter difficulty, we can also add the small numbers of qualified personnel who can identify helminth eggs under the microscope, which constricts the reliability of the results by being subject to a high degree of subjectivity due to the intervention of human interpretation during the analysis, whose central step consists in visually identifying the pathogenic structures.

Generally, the identification of helminth eggs has been resolved in two ways. The first being through specialized personnel, who undertake the identifying and quantifying of helminth eggs in the laboratory. The second form is through image classifier methods and systems, such as the one presently being proposed.

The advancements in algorithms for the processing and recognition of digital images, applied in various scientific fields, present the possibility of employing said tools for the development of a simple system for automatic identification and qualification of different helminth egg genera. The present process and system represents a reliable and objective alternative for the counting of these pathogenic organisms, and the immediate application in multiple environmental studies, at the same time easing the analysis work and taking this benefit to environmental monitoring installations which do not have the benefit of an expert in said identification and qualification.

Within prior art, it can be noted that in the international arena, there exist similar attempts to those in present invention for the detecting and quantifying of helminth eggs. However, the applicability of said programs in environmental samples has not been clearly shown.

For example, Yang et al in Yang Y. S., Park D. K., Kim H. C., Choi M-H and Chai J-Y. (2001) Automatic identification of human helminth eggs on microscopic fecal specimens using digital image processing and an artificial neural network, *IEEE Transactions on Biomedical Engineering.* 48(6):718-730, found an 84% detection rate in the differentiation of seven different species of eggs, exclusively using feces; so that this segmentation, upon applying three classification features, ends up being inadequate as regards water samples, given that optimal thresholding is not achieved when the eggs to be identified are found surrounded by various objects which are not.

In 2008 Dogantekin et al., en Dogantekin E., Yilmaz M., Dogantekin A., Avci E. and Sengur A. (2008). A robust technique based on invariant moments—ANFIS for recognition of human parasite eggs in microscopic images, *Expert Systems with Applications.* 35:728-738, they worked on the differentiation of 15 helminth egg species and one protozoan (*Giardia Lamblia*), for which images were taken from the University of Kansas Parasitological Laboratory internet site, achieving a 93% rate yield. Said images thus obtained, are poor representatives of real water samples, given that the periphery of the eggs presented in said images is free from other types of particles, which implies poor representation of the conditions in environmental samples.

In the same way, Acvi y Varol (2009), in Acvi D. and Varol A. (2009)—An expert diagnosis system for classification of human parasite eggs based on multi-class SVM, *Expert Systems with Applications.* 36:43-48, by developing a system using photographs from the same website, achieved good results in the classification rate. However, both this type of work as that of Dogantekin et al (2008), were based on the validation of their systems in a parasitological atlas, whose images do not necessarily present the recognition features and difficulties as can be seen in samples of wastewater, sludge, biosolids, soil and/or excreta.

Sauvola and Pietikainen (2000) undertake a local binarization method for the segmentation of objects when a large change in the level of gray in a specific section of the image exists, which allows for separating objects which are deep in the image with improved results.

Additionally, the above cited works use a different classification methodology form the process and system herein proposed, given that, one of the differences found between prior art and present invention, is that prior art bases its identification and quantification of images in a Multi Class Support Vector Machine (MCSV), while present invention proposes and uses three k neighbor classifiers, two of which are based on texture descriptors (LPBs) and one with morphologic and gray level features, using the Mahalonobis metric.

In so far as that which concerns the methodology for undertaking the binarization of the image, prior art seeks to develop the following: a) the gray level threshold, so that in the event that the image is found surrounded by other objects, such as is the case with different qualities of water samples, as well as sludge, biosolids and/or excreta, among others, segmentation errors could be produced, b) the characterization of each egg species, taking reference parameters such as area, perimeter, first Hue invariant moment, entropy, mean gray level, and c) a classifier which is trained in the above mentioned features.

The proposed process and system includes filters and protocols not only to be able to differentiate between species of helminth eggs, but also to be able to differentiate the latter from any other types of objects which are present in the sample, which grants versatility to the identification and quantification in the water, sludge, biosolids and/or excreta samples, among others.

The methodology of image processing proposed in the present invention versus that used in segmentation techniques through which the specific processes for the detection of objects of interest within the image to be processed were developed, with the following basic steps: image acquisition, conversion to gray scale, anisotropic filtering for decreasing noise, binarization using a threshold of Laplacian of Gaussian, binarization of the image using local threshold (Sauvola), binarization intersection, object separation by Watershed, application of morphologic filter, obtaining the features of the object and deciding if it is an egg or not: if it is, identifying the species, verifying the results by means of texture histograms and final label image display.

In the particular case of helminth eggs, the application of the techniques of present invention for developing an automatic process and system for detection and quantification of said eggs in a fast and reliable manner, allows for differentiating from other types of microscopic structures, thereby avoiding over-counting, which is the main problem with traditional identification and quantification techniques, especially in high particle content matrixes such as is the case in wastewater.

BRIEF DESCRIPTION

The identification and quantification process and system of present invention, may use different qualities of water, as well as sludge, biosolids and/or excreta, among others, focusing on the automatic identification and quantification of helminth eggs, by using image processing techniques, such as filtering, binarization and morphologic operations, among others. There are a great variety of applications which a system such as the one described by present invention may have on a national and international level, where on a day to day basis the obligatoriness of quantifying helminth eggs in various matrixes ends up being a difficult process, given the lack of qualified personnel as well as the real economic facilities of an identification and quantification system, which in addition to being simple and inexpensive, whose cost of 70 USD is decreased to less than 10 USD per sample, allows improving the speed and precision of the analysis which contributes to the surveillance of quality and safe reusable practices of the water resources.

The structure of the system is based on the acquisition or capturing of images, using techniques to improve visual appearance of the images, segmentation (division) of images in significant regions or areas and the obtaining of geometric features for the identification and quantification of the objects in the image. The system works by carrying out the following sequence parts:

Image acquisition;
Conversion to gray scale;
Anisotropic diffusion filtering to decrease noise and preserve borders;
Binarization by means of a threshold of Laplacian of Gaussian;
Image binarization by means of the Sauvola method;
Fusion of binarizations;
Separation of objects by Watershed algorithm;
Application of morphologic filter;
Obtaining the features of the object;
Classification;
Result verification by means of texture histograms and morphologic features;
Final image label display.

Said process and system has as an objective the automatic identification and quantification for different genders of helminth eggs, for different qualities of water, sludge, biosolids, soils and/or excreta, among others. In addition to the above objective, the objective of providing the counting of these pathogenic organisms in a more reliable and more precise manner, for immediate application in multiple environmental studies, at the same time easing the analysis work and carrying out this benefit to environmental monitoring installations which do not have an expert in said identification and quantification.

Another objective of the present invention is that of eliminating any type of structure which is different than the helminth eggs genera, and thereby minimizing a possible identification error and therefore a quantification error. Thus, the use of the process and system of the present invention allows carrying out the automatic identification and quantification for different genera and species of helminth eggs in water samples, by means of an algorithm design which generates a processing of microscopy images.

Another objective of the process and system of present invention is on the first instance, modifying or processing the images in such a way that it becomes simpler for the system to detect objects with similar features to those of the helminth eggs and obtaining a satisfactory classification for each one of the detected structures.

Roughly, the sample is taken with the help of a micropipette; the desired volume to be analyzed is placed on the object carrier or another complement for observing under the microscope (Doncaster disk, Sedwick-Rafter camera or Mac master camera), and afterwards the microscope is focused unto the dry weak objective (10×) and the image is captured on the computer, where it is immediately processed by the process and system of present invention.

Within the first step of the process and system of the present invention, the image acquisition, wastewater samples are observed under a microscope and using a standardized illumination microscopy, images are gathered which are digitalized to later be processed.

Within the second step of the process and system of the present invention, the conversion to gray scales, it is typical that the gathered images be found in a color format, so that it is necessary to process them to convert them into gray scale.

Within the third step of the process and system of the present invention, the anisotropic filtering, once the images in gray scale are gathered it becomes necessary to normalize the illumination in each one of them. Afterwards, an anisotropic filtering is applied which allows the image to be modified in such a way that it is easier to locate the outlines.

Within the fourth step of the process and system of the present invention, the Laplacian of Gaussian is applied in order to detect borders and a local threshold using the Sauvola method.

Within the fifth step of the process and system of the present invention, the pixels which coincide both in the image gathered by using the Laplacian of Gaussian and the local threshold of the Sauvola method are considered as part of the binarized integration.

Within the sixth step of the process and system of the present invention, the Watershed algorithm with filtered distance field, all the objects possibly connected in the image are located and separated from each other.

Within the seventh step of the process and system of the present invention, the morphologic filtration, based on the perimeter compactness and the existing relation between the major and minor axis, all objects which are found outside of the medium ±2 standard deviation range of the egg distribution, will be considered as non eggs and will not be considered in the classification process.

Within the eighth step of the process and system of the present invention, the classification algorithm for identified and labeled objects, three k neighbor classifiers were used using the Mahalanobis metric. One of the morphological features and the gray level and two based on LBP texture descriptors.

Within the last step of the process and system of the present invention, the verification of results, it is ensured that only those objects which are found within the threshold both in the shape, the gray level as well as the texture for the assigned species will be considered as eggs.

Thus, one of the advantages of the proposed system is that it includes filters and algorithms, not only to be able to differentiate between helminth egg species but also to be able to differentiate these latter from any other type of objects present in the sample, which grants versatility to the identification and quantification of these parasites in water, sludge, biosolids and/or excreta samples, among others.

BRIEF DESCRIPTION OF THE FIGURES

The particular features and advantages of the invention as well as other embodiments of the invention shall become apparent in the following description read together with the attached figures:

FIG. 11(*a*2) shows a sample of a helminth egg species identified by the automatic system as fertile *Ascaris lumbricoides.*

FIG. 11(*a*3) shows a sample of a helminth egg species identified by the automatic system as infertile *Ascaris lumbricoides.*

FIG. 11(*b*) shows a sample of a helminth egg species identified by the automatic system as *Toxocari canis.*

FIG. 11(*c*) shows a sample of a helminth egg species identified by the automatic system as *Trichuris trichiura.*

FIG. 11(*d*) shows a sample of a helminth egg species identified by the automatic system as *Hymenolepis diminuta.*

FIG. 11 (*e*) shows a sample of a helminth egg species identified by the automatic system as *Hymenolepis nana.*

FIG. 11(*f*) shows a sample of a helminth egg species identified by the automatic system as *Taenia solium.*

FIG. 11(*g*) shows a sample of a helminth egg species identified by the automatic system as *Schistosoma mansoni.*

FIG. 11(*h*) shows a sample of a helminth egg species identified by the automatic system as *Ancylostoma duodenale* and *Necator americanus* (Hookworms).

FIG. 11(*i*) shows a sample of a helminth egg species identified by the automatic system as *Fasciola hepatica* and *Fasciolopsis buski* (Liver fluke).

FIG. 18(*b*) shows a comparative of the eccentricity in different species of helminth eggs.

DETAILED DESCRIPTION OF THE INVENTION

Figure 1:
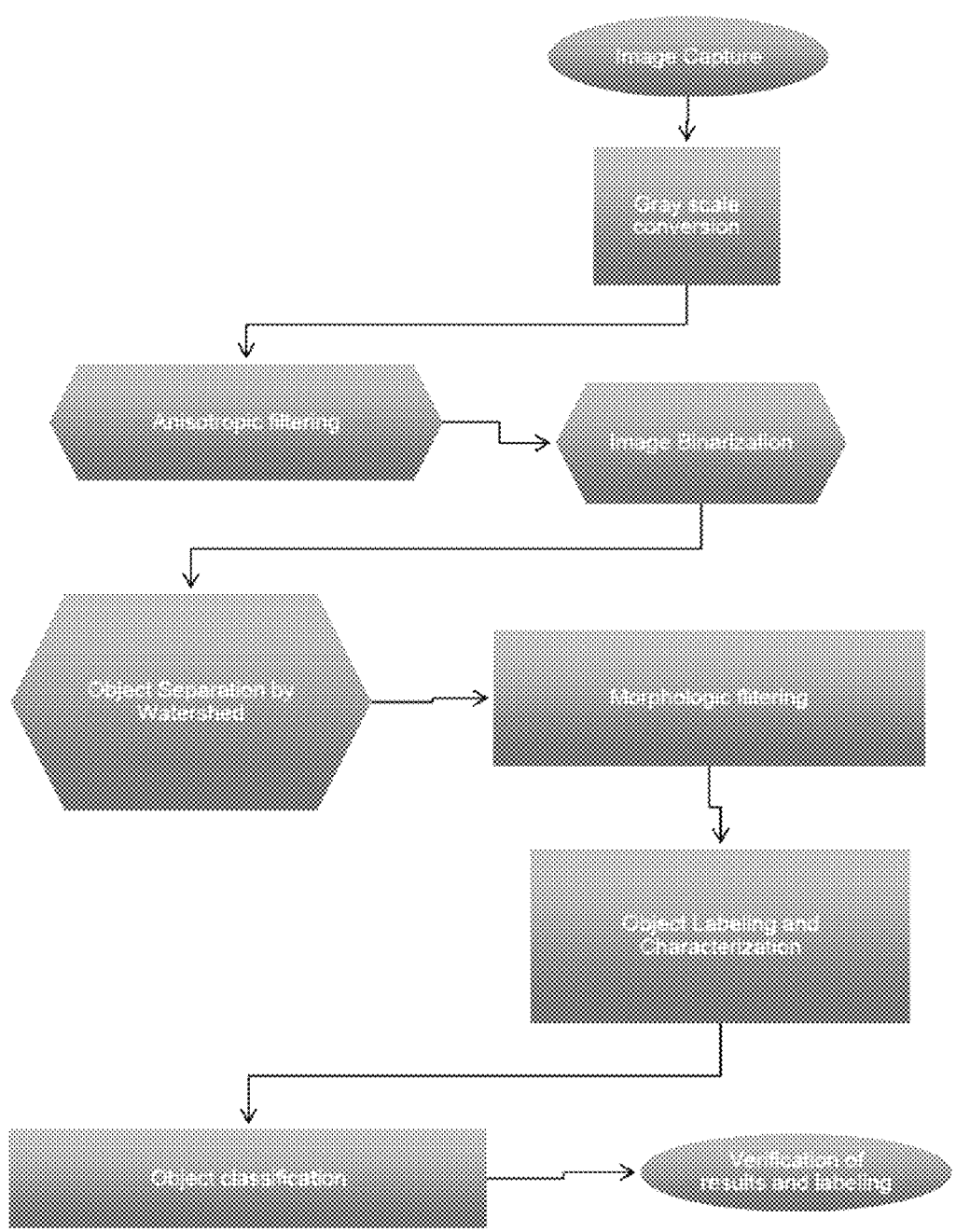
FIG. 1 shows a flow diagram of the system and process of present invention.
Figure 2:
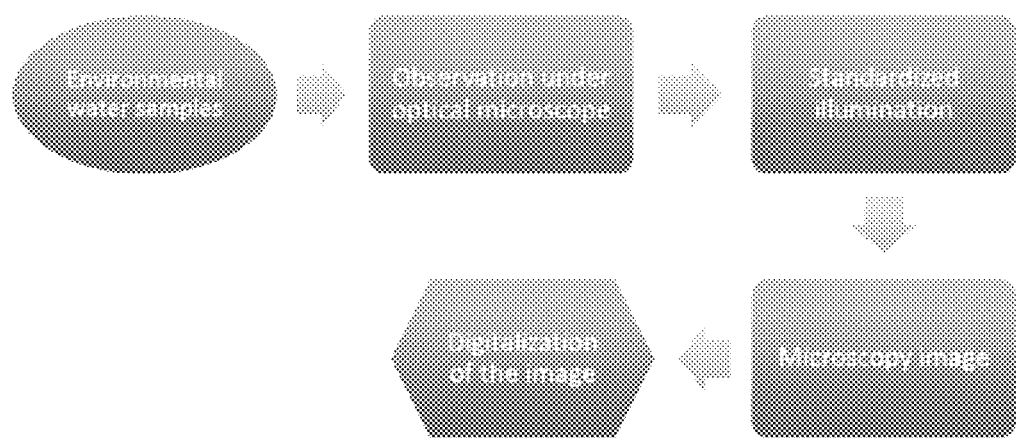
FIG. 2 shows a flow diagram of the system and process of the image acquisition step.

The main process/system is formed by various processes, such as can be seen in FIG. 1 as well as FIGS. 2 through 10, the first of them consists in the acquiring of training images, with different types of helminth eggs, the photograph files consisted in a total of 720 images, including 11 helminth egg species selected for the study (FIGS. 11*a*1 through 11*a*2), fertile *Ascaris lumbricoides*, (FIG. 11*b*) *Toxocara canis*, (FIG. 11*c*) *Trichuris trichiura*, (FIG. 11*d*) *Hymenolepis diminuta*, (FIG. 11*e*) *Hymenolepis nana*, (FIG. 11*f*) *Taenia solium*, (FIG. 11*g*) *Schistosoma mansoni*, (FIG. 11*h*) *Ancylostoma duodenale* and *Necator americanus* (Hookworms), (FIG. 11*i*) *Fasciola hepatica, Fasciolopsis buski* (Liver fluke). 50% was used as a set of data for training, while the other 50% was used to carry out the validation of the system.

Figure 3:
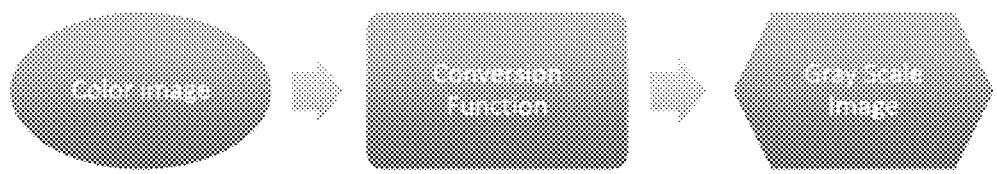
FIG. 3 shows a flow diagram of the system and process of the gray scale conversion step.

The images acquired are in full color so that it is necessary to convert each one of them into gray scale, such as can be seen in FIG. 3, normalizing the illumination of the images to obtain even greater similarity amongst them. To normalize the images, it is necessary to process them with a series of filters. However, it is clear to a person skilled in the art that the image may be acquired on a gray scale, so that the conversion step from colors into gray scale could be optional.

The first filter is an anisotropic filter and afterwards the images resulting from two types of binarization are applied, the first is the Laplacian of Gaussian and the second is a local Sauvola threshold. After that, the final binarization results of the intersection of the former two processes, to later apply a Watershed algorithm with a filtered distance field for separating objects. To these binarized images, a morphologic filter is applied to eliminate out of size objects or out of size relation. For the remaining objects, the features are calculated in shape, gray level as well as in texture to be used by the classifier. It was determined that an object belongs to a certain egg species in function of the summation of votes given by the three classifiers. The results are validated by means of texture histograms. The final labeled image is then displayed.

The flow diagram of the process/system consists in a general manner with a determined number of structural elements. Given that as the number and type of structures to be identified increases, the complexity of the system and the processing resources required for the image also increase accordingly, the automated system for detection fed by an image bank statistically representative of the variations in each class of structures to be differentiated, thereby creating a database for the training of the process/system itself, along with a modular topology process which allows for recognizing specific parts of the image of each structure, and where each module is specialized in concrete sections of the image.

Therefore, a sequence of steps is outlined below.

Figure 10:
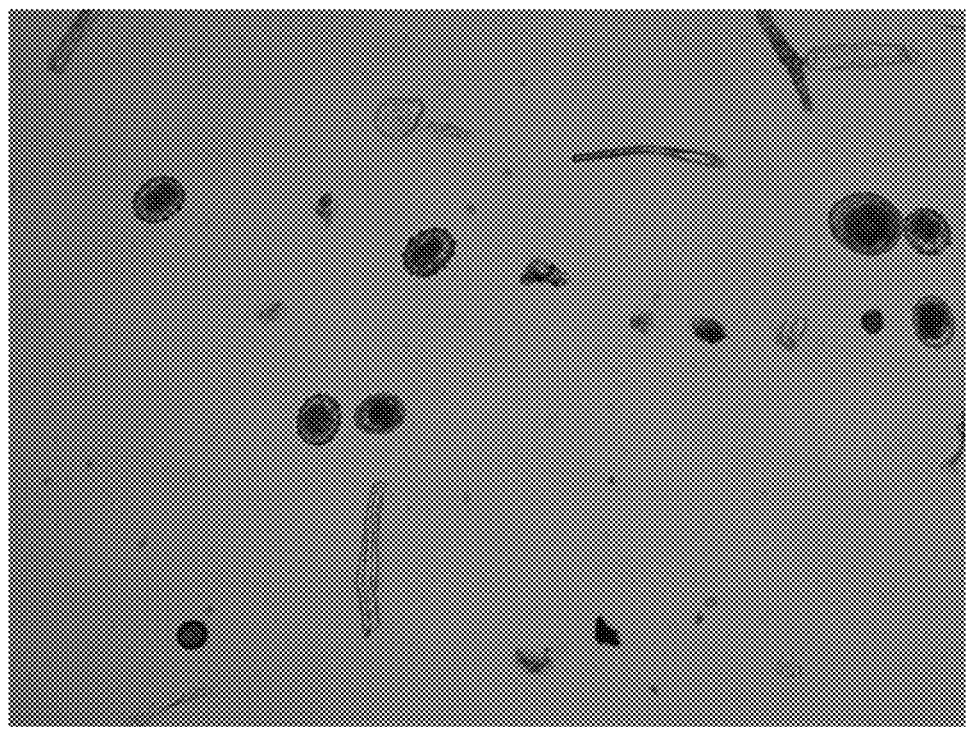
FIG. 10 shows an original image in color acquired by the system and process of the present invention.
Figure 11:
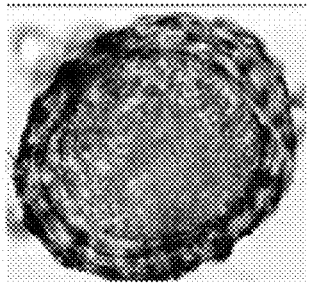
FIG. 11(*a*1) shows a sample of a helminth egg species identified by the automatic system as fertile *Ascaris lumbricoides.*
Figure 11:
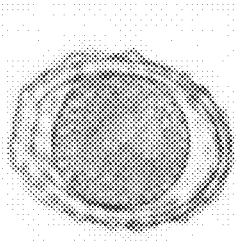
Figure 11:
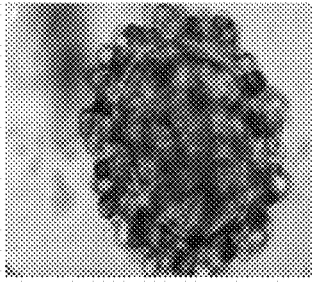
Figure 11:
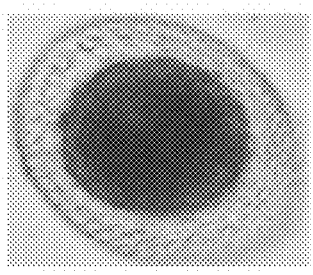
Figure 11:
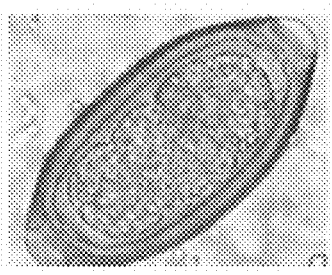
Figure 11:
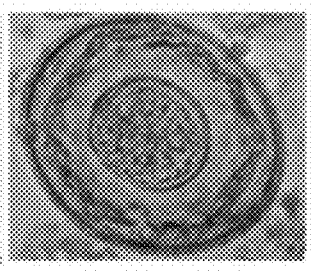
Figure 11:
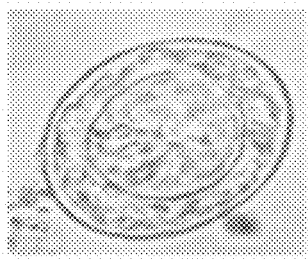
Figure 11:
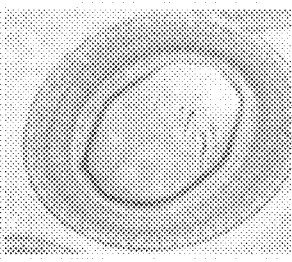
Figure 11:
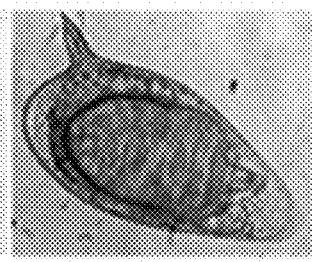
Figure 11:
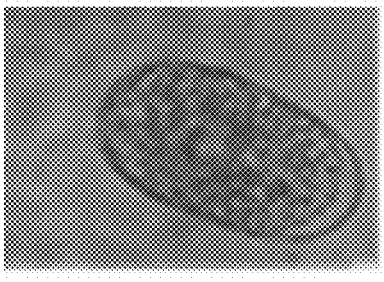
Figure 11:
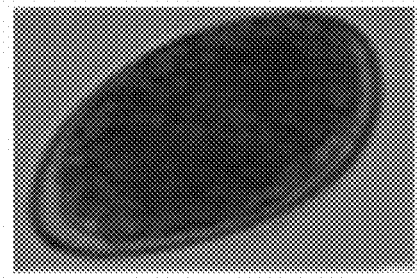
Figure 12:
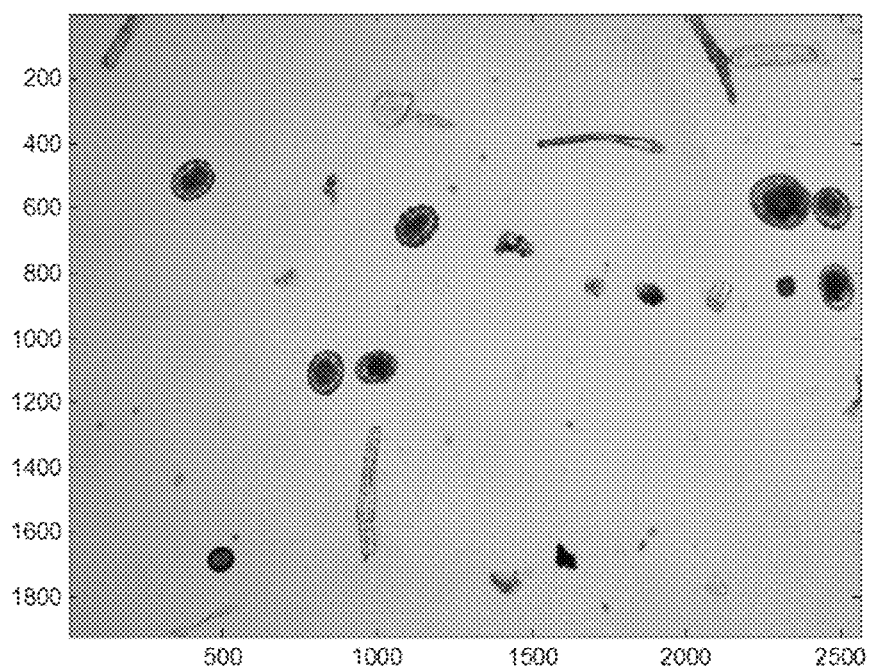
FIG. 12 shows an acquired original image converted into gray levels.

The image is obtained, such as can be seen in FIG. 10, preparing a Sedgwick-Rafter chamber containing the problem sample with it or with the eggs in question, and placing it on the viewing slide of an optical microscope. The structure in question is focused with the selected objective (10×) of the optical microscope, and the image is captured by means of a coupled camera achieving a digital image, said image having the possibility of being either in color or on a gray scale; in the present example the image was captured in color.

Figure 4:
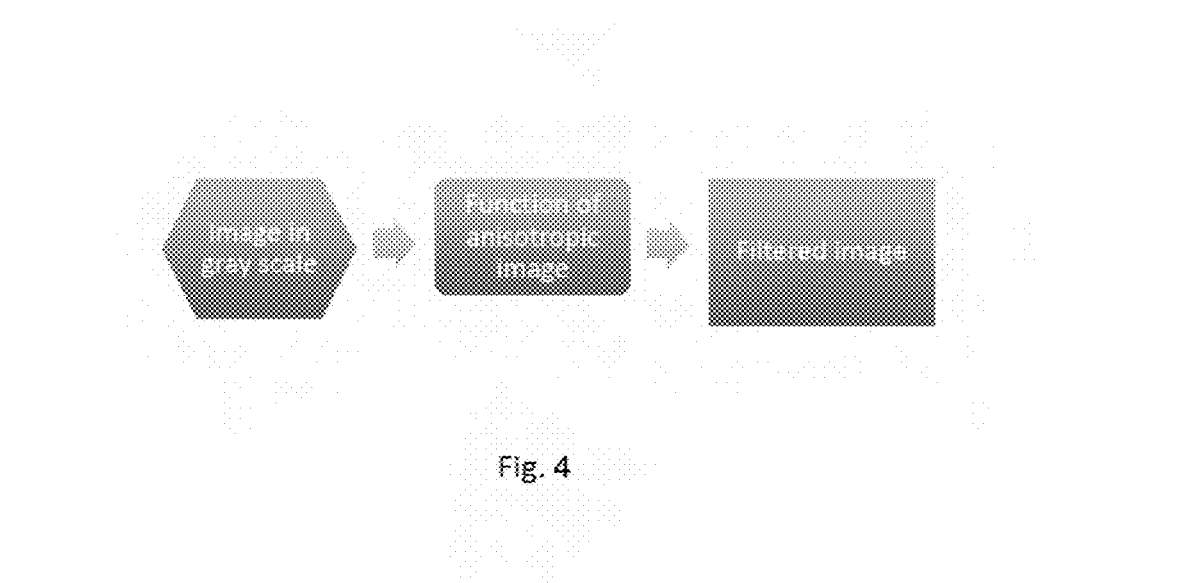
FIG. 4 shows a flow diagram of the system and process of the anisotropic filtering step.

Afterwards it is turned into a gray scale; this process allows converting the pixel average of the basic color components to pixels on the gray scale but maintaining the luminosity of the image, such as can be seen in FIG. 4.

Figure 5:
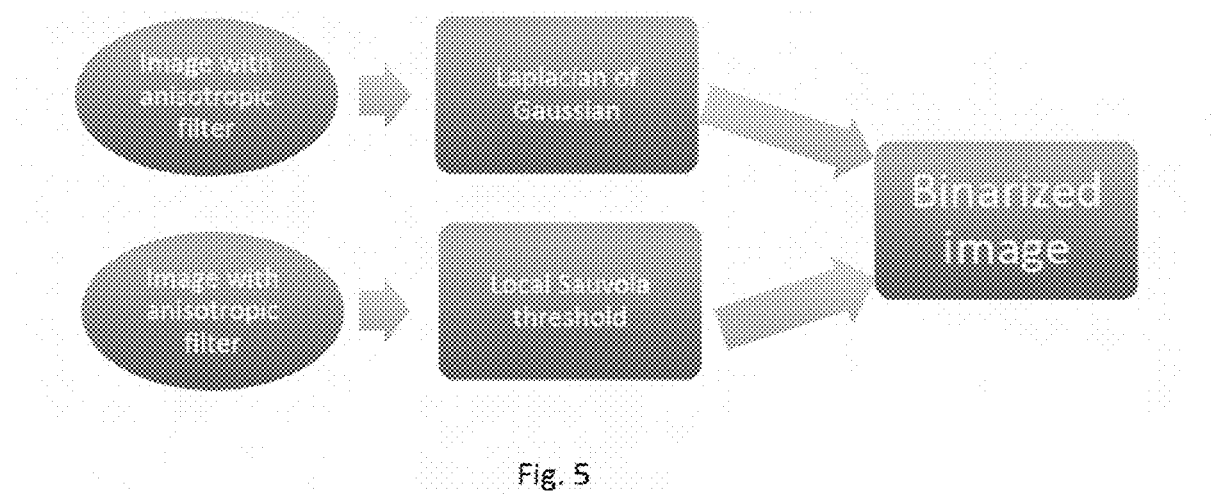
FIG. 5 shows a flow diagram of the system and process of the binarization.

Afterwards, the anisotropic filter is applied, which allows improving the texture of the surface of an object through the average value of each pixel with regards to its neighbors. In this case the manner in which the inside of the objects is seen is improved, that is, it filters the borders, removes the noise preserving the details of the border of the object applying an anisotropic diffusion filter (FIG. 5). This method uses the gradient of the image to decrease the noise and preserves the borders of the objects. An instantaneous variation coefficient serves as a detector for the borders on the images with noise. The function presents some high values on the borders or in high contrast areas, while it presents lower values in the homogeneous areas.

Figure 6:
FIG. 6 shows a flow diagram of the system and process of the Watershed algorithm with filtered distance field step.
Figure 7:
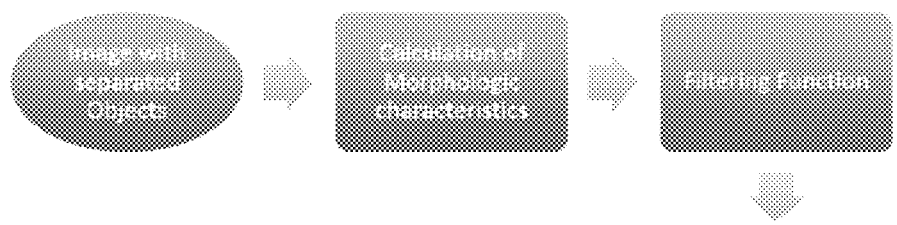
FIG. 7 shows a flow diagram of the system and process of the morphologic filtering step.
Figure 8:
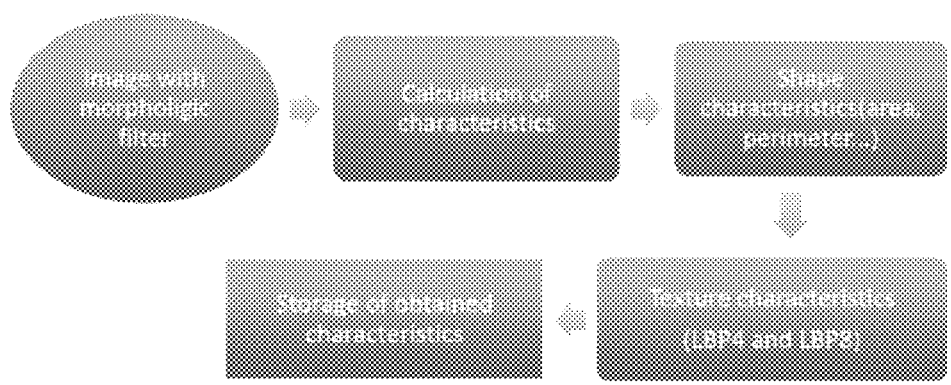
FIG. 8 shows a flow diagram of the system and process of the gathering of the features of the identified objects.
Figure 9:
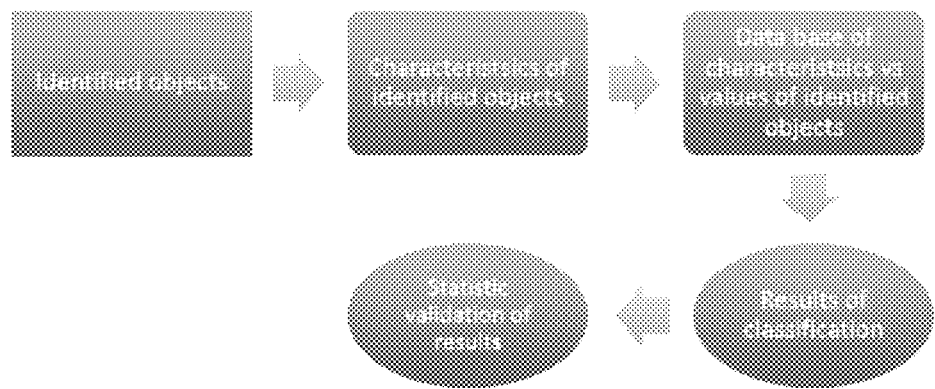
FIG. 9 shows a flow diagram of the system and process of the classification and validation.

The detection of objects by means of filtered image binarization was undertaken by means of merging two segmentation algorithms: border detection by means of Laplacian of Gaussian:

$$LoG(x, y) = -\frac{1}{\pi\sigma^4}\left[1 - \frac{x^2 + y^2}{2\sigma^2}\right]e^{-\frac{x^2+y^2}{2\sigma^2}} \quad (1)$$

and a local threshold which uses the Sauvola method (Sauvola and Pietikainen, 2000). In this method, the threshold t (x, y) is calculated using the average m (x, y) and the standard deviation s (x, y) of the gray pixel levels within a size window n×n centered on the pixel (x, y):

$$t(x, y) = m(x, y)\left[1 + k\left(\frac{s(x, y)}{R} - 1\right)\right] \quad (2)$$

where R is the maximum value of the standard deviation (R=128 for an image in gray scale), k is a parameter which takes positive values between 0.2 and 0.5. One example is shown in FIG. 6.

Figure 13:
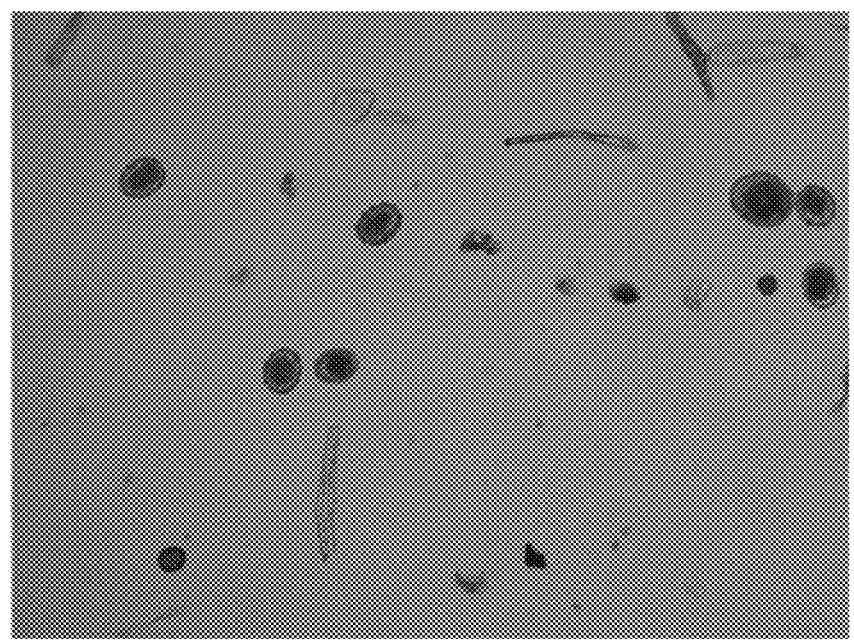
FIG. 13 shows an image filtered with an anisotropic filter.
Figure 14:
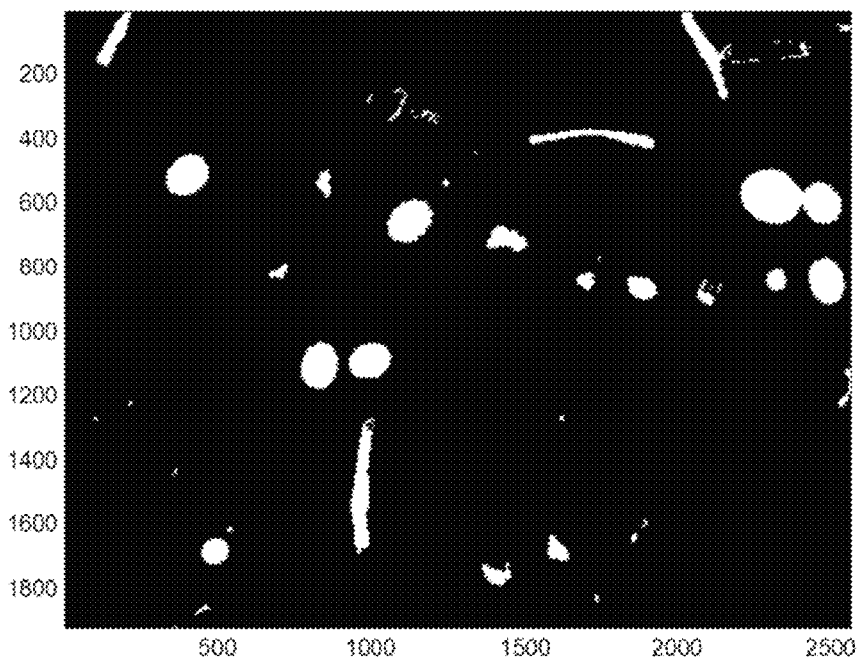
FIG. 14 shows the binarization of the image by means of the Laplacian of Gaussian threshold.
Figure 15:
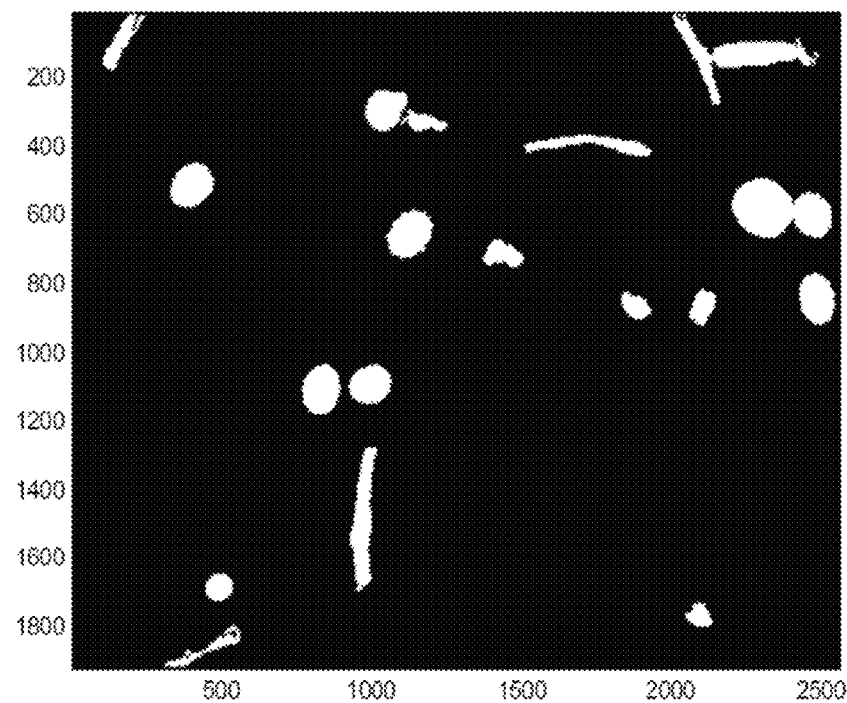
FIG. 15 shows the binarization of the image by means of the Sauvola method.

Finally, the pixels which coincide both with the image obtained by means of the Laplacian of Gaussian as well as the local Sauvola threshold will be considered as part of the binarized image (FIGS. 13 and 14).

Figure 16:
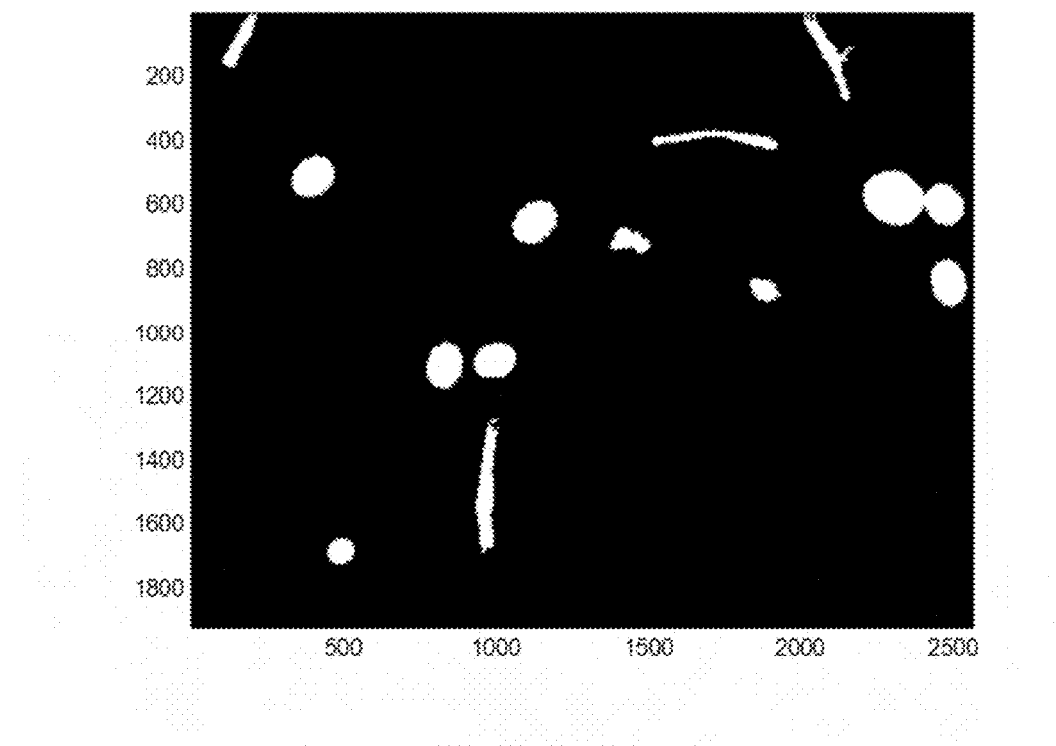
FIG. 16 shows the final binarization of the image having fused the two prior binarizations.
Figure 17:
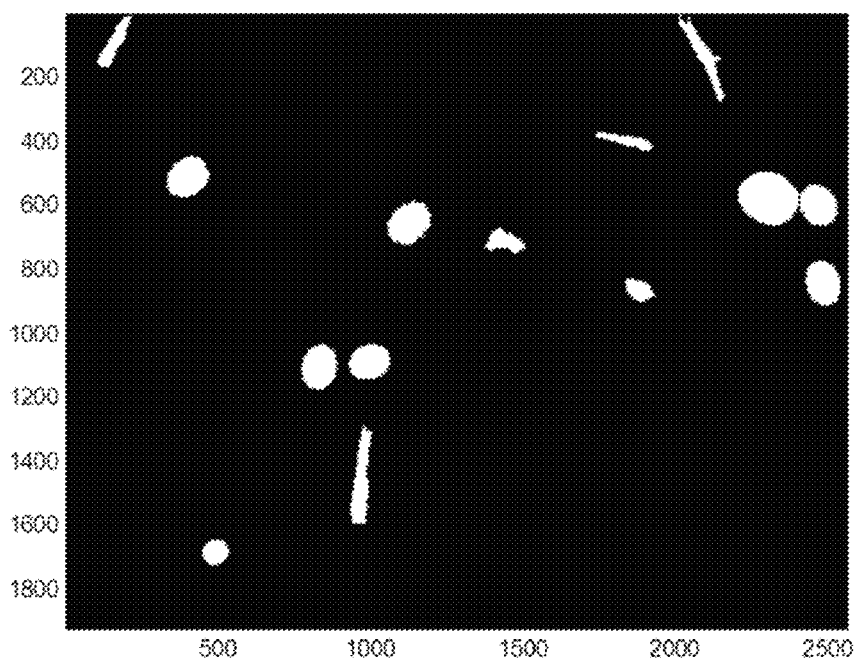
FIG. 17 shows the resulting image after having separated the objects by Watershed algorithm.

Said fused binarization is afterwards processed by means of the Watershed algorithm, which in Spanish is known as a water division line, which is a technique for separation of connected objects. Intuitively, the technique may consider an image on a gray scale such as the topographic image of a terrestrial relief; wherein each pixel is associated as a "height" value of its corresponding gray level. In this sense, one could think that the gray intensities with greater broadness correspond to plains or mountains whereas those intensities with smaller values correspond to valleys and rivers. The technique additionally incorporates a flooding of the valleys process, from the lowest height values (local minimum values, which constitute flooding basins surrounded by mountain chains), up to the tallest height levels. The low gray intensity areas are also known as basins, through which the water will flow and will flood all the topography of the image; that is, the water will flow in each of the identified basins. The flooding process will continue until the contiguous basins join together, forming union lines which will represent the borders of homogeneous regions and which constitute the result of the separation of objects (FIG. 16).

A segmentation is undertaken which allows extracting the borders of the regions existing in the image, according to its mathematical morphology; in such a way that they can be arranged by gray levels allowing improvement in the efficiency of the procedure. The step consists of detecting the areas where it is possible to find eggs, whose approximate size is determined by means of a Watershed algorithm (with a transformed filtered distance), which is useful when within the sample the objects are surrounded by debris, making it difficult to detect them through more simple codes such as threshold.

Figure 18A:
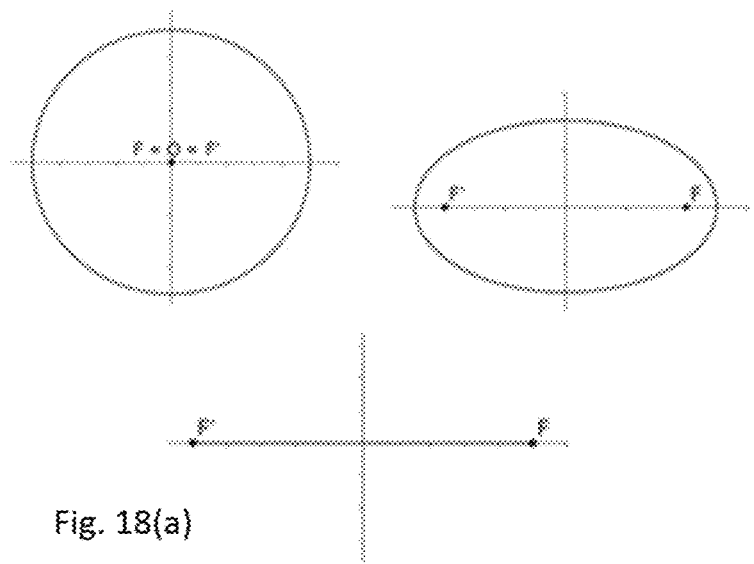
FIG. 18(*a*) shows the determining of the features of the objects, such as the eccentricity of an ellipse used to characterize the images.
Figure 18B:
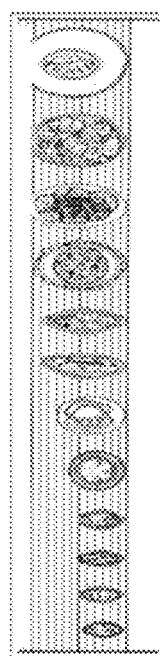
Figure 19:
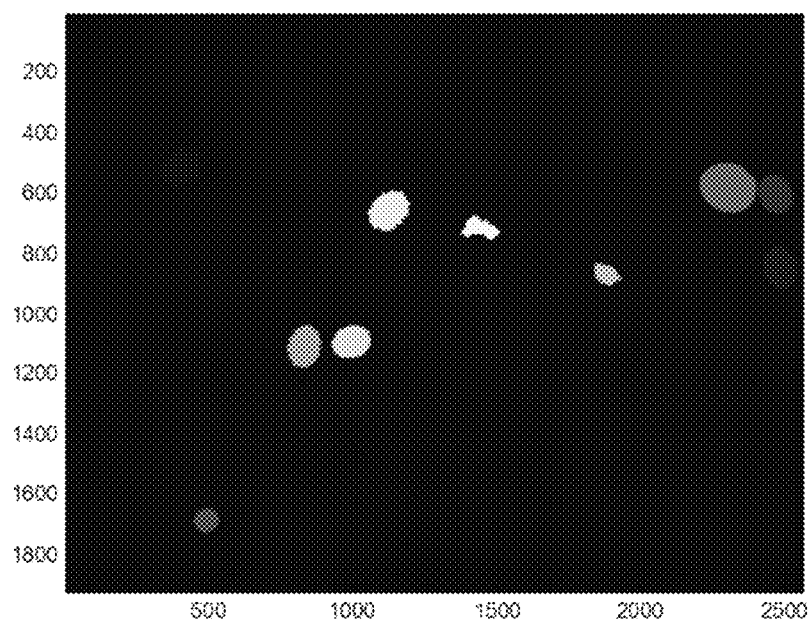
FIG. 19 shows the resulting image after the morphologic filtering.

Afterwards, the image must be processed by perimeter compactness (the relation between the area and the perimeter) as well as by the existing relation between the greater and lesser axis (FIGS. 18a and 18b). All objects which are found outside the average range ±2 standard deviations of the egg distribution, shall be considered as non eggs and will not be considered for the classification process (FIG. 19).

The following process consists in obtaining the features and the labeling of the different objects which the system detected. To determine which class the objects belong to which probably are eggs, three k neighbor classifiers were used based on the Mahalanobis distance. One of morphological features and gray level and two based on the descriptions of LBP textures.

The class of the object will be determined as a function of a species to which the closest neighbors belong to: five neighbors with classic features, three with the closest texture (LBP4) and three with distant texture (LBP8).

Figure 20:
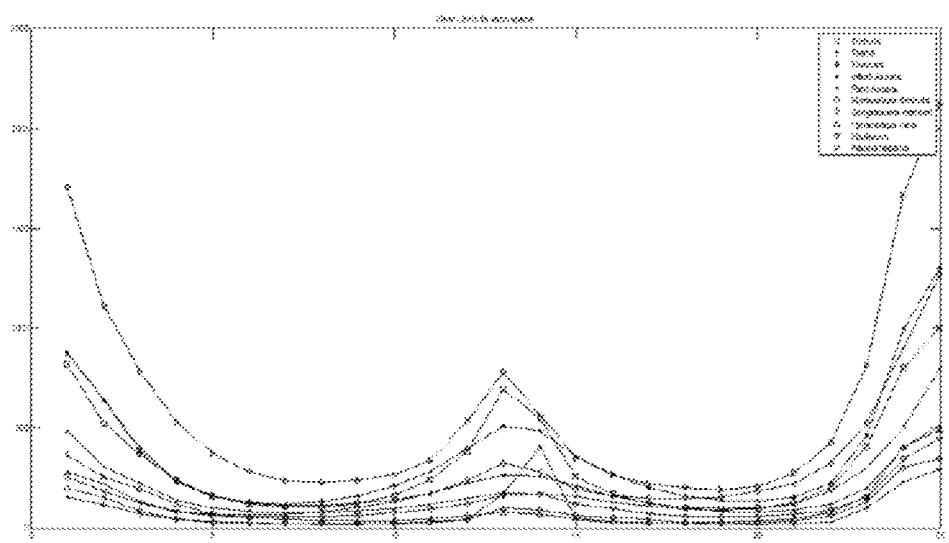
FIG. 20 shows the average LBP8 for each of the egg species.

The characteristics which are taken into account regarding the features which are used in the sorting are detailed below:
  Shape: area, perimeter, circularity metric, greater and lesser axis, relation between the axis and the first Hu invariant moment.
  Gray levels of the pixels: average, standard deviation, kurtosis, entropy and relation to shape of object. FIG. 20 shows an example of the histograms generated by the LBPs texture descriptors.

Finally, after having classified the object a verification step was added to ensure that only those objects which are found within the threshold in so far as shape, gray levels as well as texture for the assigned species will be considered as eggs.

The metrics used for the validation of the LBP8 texture are the correlation coefficient $$\text{Corr}_{coef} = \frac{n\sum (LBP_{class}LBP_{obj}) - \sum (LBP_{class})\sum (LBP_{obj})}{\sqrt{[n\sum LBP_{class}^2 - (\sum LBP_{class})^2][n\sum LBP_{obj}^2 - (\sum LBP_{obj})^2]}} \quad (3)$$

Where: $LBP_{class}$ is the average LBP8 histogram of the proposed class.

$LBP_{obj}$ is the LBP8 histogram of the object to be evaluated.

N=25, number of elements in the histogram

If the correlation coefficient is lower than the threshold of each class, the object shall be considered garbage.

Figure 21:
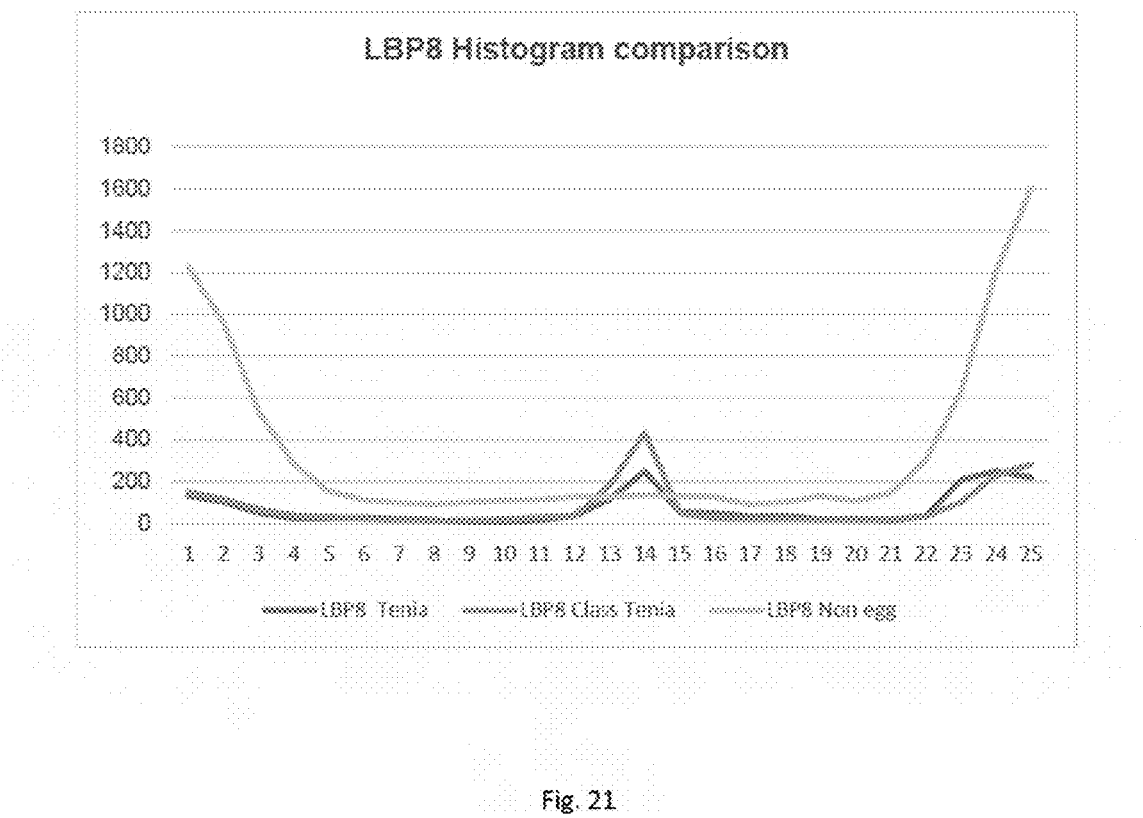
FIG. 21 shows the LBP8 histogram comparison for validation.

The second feature for texture validation is a normalization of the Euclidian distance between the average LBP8 histogram of the proposed class and that of the object.

$$Dist_{norm} = \frac{\sqrt{\sum_{i=1}^{n}(LBP_{class_i} - LBP_{obj_i})^2}}{\mu_{LBP}} \quad (4)$$

Where $\mu_{LBP}$ is the average value of the $LBP_{class}$ (FIG. 21).

Figure 22:
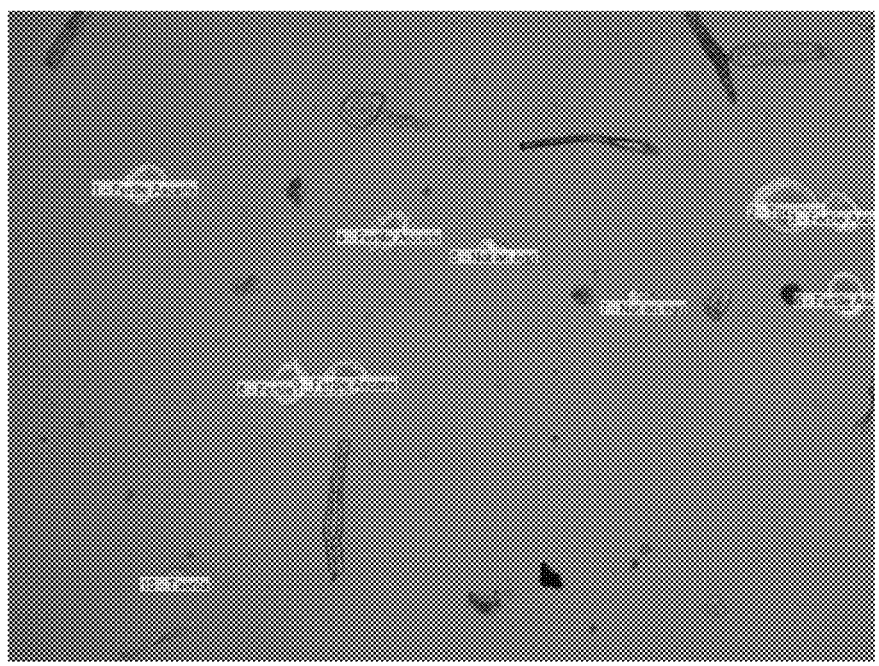
FIG. 22 shows the validation and labeling of the species.

One of the advantages of the proposed system is that it includes filters and algorithms, not only to differentiate between helminth egg species, but also to be able to differentiate these latter from any other type of objects present in various types of samples (water, soils, excreta and sludge) which grants its versatility for the identification of these parasites in environmental samples. FIG. 22 shows the final labeling of the objects.

An embodiment of the inventive methods is a computer readable means (or a digital storage or data carrier means) which comprises, registering in itself, any of the embodiments of the method herein described.

Another embodiment is the capability to implement the present method like a cloud computing implementation.

In some embodiments a logical programmable device can be used to undertake some or all of the functions of the methods described in present document. In some embodiments, the logical device can cooperate with a microprocessor and a memory to undertake one of the methods herein described. Generally, the methods are preferably undertaken by an apparatus of a physical element.

Even though the invention has been described in terms of several specific embodiments, the persons skilled in the art would recognize that the invention may be undertaken with alterations within the scope of present invention as described in present document.

The invention claimed is:

1. A process for identifying and quantifying helminth eggs in environmental samples, from at least one image comprising borders, wherein said process comprises the steps of:
  filtering the at least one image with an anisotropic diffusion filter to locate the borders on the at least one image, thereby obtaining at least one filtered image;
  filtering the at least one filtered image by applying at least one Laplacian of Gaussian threshold to detect changes within the at least one filtered image, thereby obtaining at least one binarized image;
  processing the at least one binarized image by means of a Watershed algorithm with a filtered distance for segmenting the at least one binarized image and extracting boundaries in the at least one binarized image, thereby obtaining at least one second filtered image;
  filtering the at least one second filtered image to eliminate objects by perimeter compactness, by considering the size of objects in the at least one second filtered image and separating the differences to avoid false positive, thereby obtaining at least one image with identified objects;
  characterizing the identified objects in the at least one image with identified objects by segmenting the objects by means of gray profiles, thereby obtaining characterized objects;
  classifying the characterized objects according to a statistic classifier for identifying and quantifying the type of helminth egg; and
  validating the result in a statistical manner;
  wherein the statistic classifier is a k neighbor classifier based on the Mahalanobis distance, for which k neighbor classifiers are used, one of morphological features and gray level and two based on Local Binary Pattern (LBP) texture descriptors; wherein the class of object will be determined as a function of a species to which the closest neighbors belong to, five neighbors with classic features, three with closest texture (LBP4) and three with distance texture (LBP8).

2. The process according to claim 1, wherein the at least one image is at least a color image, and wherein the process, prior to the first filtering step, includes the step of
  converting the at least one color image into a gray scale image, normalizing the illumination of the images, and obtaining images with similarities.

3. The process according to claim 1, wherein the filtering of the at least one image with the anisotropic filter comprises
  improving the texture of the surface of at least one object through the average value of each pixel relative to its neighbors,
  improving the inner part of the at least one object, and filtering the borders of the at least one object, decreasing the noise and preserving the details of the borders of the at least one object.

4. The process according to claim 1, wherein the changes during the filtering of the at least one Laplacian of Gaussian (LoG) presents a function which has the following expression:

$$LoG(x, y) = -\frac{1}{\pi\sigma^4}\left[1 - \frac{x^2 + y^2}{2\sigma^2}\right]e^{-\frac{x^2+y^2}{2\sigma^2}}$$

wherein x is defined as a pixel coordinate along a horizontal x-axis of the image, y is defined as a pixel coordinate along a vertical y-axis of the image, and the x and y axes coordinates are marked in standard deviations (σ).

5. The process according to claim 1, wherein simultaneously the at least one filtered image is filtered applying at least one local threshold which uses the Sauvola method, obtaining at least one second binarized image; wherein the threshold t(x, y) is calculated using the average m(x, y) and the standard deviation s(x, y) of the levels of gray of the pixels within a window with an n×n size centered on the pixel (x, y):

$$t(x, y) = m(x, y)\left[1 + k\left(\frac{s(x, y)}{R} - 1\right)\right]$$

wherein the m(x, y) is the mean value in the pixel (x, y) neighborhood, s(x, y) is the respective standard deviation, R is the dynamic range of standard deviation (R=128 for an image in gray scale), and the parameter k gets positive values between 0.2 and 0.5;
and wherein
the first and second binarized images are fused, maintaining the pixels which coincide within the image obtained by means of the Laplacian of Gaussian and the local Sauvola threshold.

6. The process according to claim 1, wherein the Watershed algorithm with filtered distance field considers the binarized image as a topographic field, wherein the process comprises associating height values with corresponding gray levels, ordering pixels from the image by gray levels and detecting areas in the image where it is possible to find eggs.

7. The process according to claim 1, wherein the verification of results is a validation of the LBP8 texture using the following correlation coefficient:

$$\text{Corr}_{coef} = \frac{n\sum(LBP_{class}LBP_{obj}) - \sum(LBP_{class})\sum(LBP_{obj})}{\sqrt{[n\sum LBP_{class}^2 - (\sum LBP_{class})^2][n\sum LBP_{obj}^2 - (\sum LBP_{obj})^2]}}$$

Wherein $LBP_{class}$ is the average LBP8 histogram of the proposed class; $LBP_{obj}$ is the LBP8 histogram of the object to be evaluated; and n=25, number of elements in the histogram;
wherein the second feature for the texture validation is a normalization of the Euclidian distance between the average LBP8 histogram of the proposed class and of the object $$Dist_{norm} = \frac{\sqrt{\sum_{i=1}^{n}(LBP_{class_i} - LBP_{obj_i})^2}}{\mu_{LBP}}$$

where $\mu_{LBP}$ is the average value of the $LBP_{class}$ histogram.

8. A system for the identification and quantification of helminth eggs in water, sludge, biosolids and/or excreta samples, among others, the system comprising:
one or more processors and a computer readable non transitory storage means, an optical microscope and a camera adapted to the processor for the acquisition of at least one image comprising borders;
an anisotropic filter for conserving the borders in the at least one image and obtaining at least one filtered image;
a Gaussian filter which applies a Laplacian of Gaussian to the at least one filtered image for detecting changes in the at least one filtered image, and obtaining at least one binarized image;
a Watershed algorithm with filtered distance field for dividing objects, extracting the borders from the binarized image and obtaining at least one second filtered image; and
a filter for eliminating objects by perimeter compactness for considering the size of the objects in the at least one second filtered image, separating the differences to avoid false positives, and obtaining an image with identified objects;
wherein the processor is capable of characterizing the identified objects in the image with identified objects by segmenting the objects by means of gray profiles, thereby obtaining characterized objects;
wherein the processor is capable of classifying the characterized objects according to a statistic classifier for identifying and quantifying the type of helminth egg; and
wherein the processor is capable of validating the results;
wherein the statistic classifier is a k neighbor based on the Mahalanobis distance, for which three k neighbor classifiers are used, one of morphological features and gray level and two based on Local Binary Pattern (LBP) texture descriptors; wherein the class of object will be determined as a function of a species to which the closest neighbors belong to, five neighbors with classic features, three with closest texture (LBP4) and three with distant texture (LBP8).

9. The system according to claim 8, wherein the at least one image is at least a color image, and wherein the processor is capable of converting the at least one color image into at least one a gray scale image, normalizing the illumination of the images, and obtaining images with similarities; wherein
the at least one image is a plurality of images, and wherein the system trains using at least a portion of the plurality of images such as training data and the remaining portion of said plurality of images is used to carry out the process.

10. The system according to claim 8, wherein the anisotropic filter improves the texture of the surface of an object through the average value of each pixel relative to its neighbors, improves the inner part of the objects, and filters the borders, decreasing the noise and preserving the details of the border of the objects.

11. The system according to claim 8, wherein the changes provided by the filter of the at least one Laplacian of Gaussian (LoG) presents a function which has the following expression:

$$LoG(x, y) = -\frac{1}{\pi\sigma^4}\left[1 - \frac{x^2 + y^2}{2\sigma^2}\right]e^{-\frac{x^2+y^2}{2\sigma^2}}$$

wherein x is defined as a pixel coordinate along a horizontal x-axis of the image, y is defined as a pixel coordinate along a vertical y-axis of the image, and the x and y axes coordinates are marked in standard deviations (σ).

12. The system according to claim 8, wherein simultaneously the at least one filtered image is binarized applying at least one local threshold which uses the Sauvola method, obtaining at least one second binarized image; wherein the threshold t(x, y) is calculated using the average m(x, y) and the standard deviation s(x, y) of the levels of gray of the pixels within a window with an n×n size centered on the pixel (x, y):

$$t(x, y) = m(x, y)\left[1 + k\left(\frac{s(x, y)}{R} - 1\right)\right]$$

wherein R is the maximum value of the standard deviation (R=128 for an image in gray scale), k is a parameter which measures positive values between 0.2 and 0.5; wherein the first and second binarized images are fused, maintaining the pixels which coincide within the image obtained by means of the Laplacian of Gaussian and the local Sauvola threshold.

13. The system according to claim 8 wherein the Watershed algorithm with filtered distance field considers the binarized image as one transformed from filtered distance.

14. The system according to claim 8, wherein the validation of results is a validation of the LBP8 texture using the following correlation coefficient:

$$\text{Corr}_{coef} = \frac{n\sum(LBP_{class}LBP_{obj}) - \sum(LBP_{class})\sum(LBP_{obj})}{\sqrt{[n\sum LBP_{class}^2 - (LBP_{class})^2][n\sum LBP_{obj}^2 - (LBP_{obj})^2]}}$$

Wherein $LBP_{class}$ is the average LBP8 histogram of the proposed class; $LBP_{obj}$ is the LBP8 histogram of the object to be evaluated; and n=25, number of elements in the histogram; wherein the second feature for the texture validation is a normalization of the Euclidian distance between the average LBP8 histogram of the proposed class and of the object $$Dist_{norm} = \frac{\sqrt{\sum_{i=1}^{n}(LBP_{class_i} - LBP_{obj_i})^2}}{\mu_{LBP}}$$

where $\mu_{LBP}$ is the average value of the $LBP_{class}$ histogram.

15. A nontransitory means readable by computer for identifying and quantifying helminth eggs in environmental samples, from at least one image comprising borders, wherein the process comprises the steps of:
filtering the at least one image with an anisotropic diffusion filter to locate the borders on the at least one image, thereby obtaining at least one filtered image;
filtering the at least one filtered image by applying at least one Laplacian of Gaussian threshold to detect changes within the at least one filtered image, thereby obtaining at least one binarized image;
processing the at least one binarized image by means of a Watershed algorithm with a filtered distance for segmenting the at least one binarized image and extracting boundaries in the at least one binarized image, thereby obtaining at least one second filtered image;
filtering the at least one second filtered image to eliminate objects by perimeter compactness, by considering the size of objects in the at least one second filtered image and separating the differences to avoid false positive, thereby obtaining at least one image with identified objects;
characterizing the identified objects in the at least one image with identified objects by segmenting the objects by means of gray profiles, thereby obtaining characterized objects;
classifying the characterized objects according to a statistic classifier for identifying and quantifying the type of helminth egg; and
validating the result in a statistical manner;
wherein the statistic classifier is a k neighbor classifier based on the Mahalanobis distance, for which k neighbor classifiers are used, one of morphological features and gray level and two based on Local Binary Pattern (LBP) texture descriptors; wherein the class of object will be determined as a function of a species to which the closest neighbors belong to, five neighbors with classic features, three with closest texture (LBP4) and three with distance texture (LBP8).

\* \* \* \* \*

UNITED STATES PATENT AND TRADEMARK OFFICE
CERTIFICATE OF CORRECTION

PATENT NO. : 9,773,154 B2
APPLICATION NO. : 14/879466
DATED : September 26, 2017
INVENTOR(S) : Jiménez Cisneros et al.

Page 1 of 1

It is certified that error appears in the above-identified patent and that said Letters Patent is hereby corrected as shown below:

On the Title Page

Inventors (72): Delete "Blanca Elena JIMÉNEZ CISNEROS, Distrito Federal (MX); Catalina MAYA RENDÓN, Distrito Federal (MX); Gustavo Adolfo Rodrigo VELÁSQUEZ RODRÍGUEZ, Distrito Federal (MX); José Antonio BARRIOS PÉREZ, Distrito Federal (MX); Fernando ARÁMBULA COSÍO, Distrito Federal (MX)" and insert -- Blanca Elena JIMÉNEZ CISNEROS, Coyoacán, Distrito Federal (MX); Catalina MAYA RENDÓN, Coyoacán, Distrito Federal (MX); Gustavo Adolfo Rodrigo VELÁSQUEZ RODRÍGUEZ, Coyoacán, Distrito Federal (MX); José Antonio BARRIOS PÉREZ, Coyoacán, Distrito Federal (MX); Fernando ARÁMBULA COSÍO, Coyoacán, Distrito Federal (MX) --

Assignee (73): Delete "Coyoacá, Distrito Federal" and insert -- Coyoacán, Distrito Federal --

Signed and Sealed this
Twenty-first Day of November, 2017

Joseph Matal
*Performing the Functions and Duties of the
Under Secretary of Commerce for Intellectual Property and
Director of the United States Patent and Trademark Office*